UNITED STATES PATENT OFFICE.

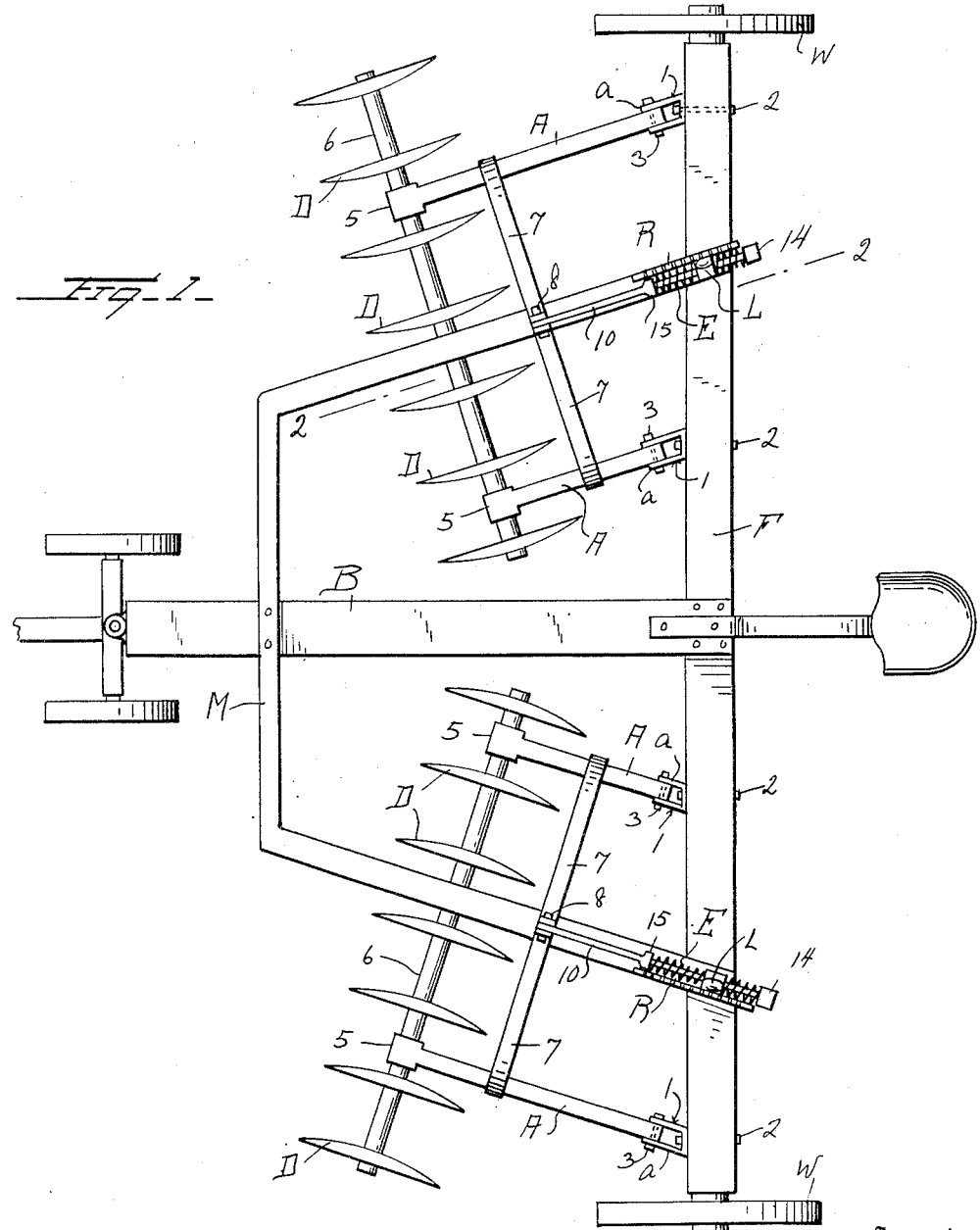

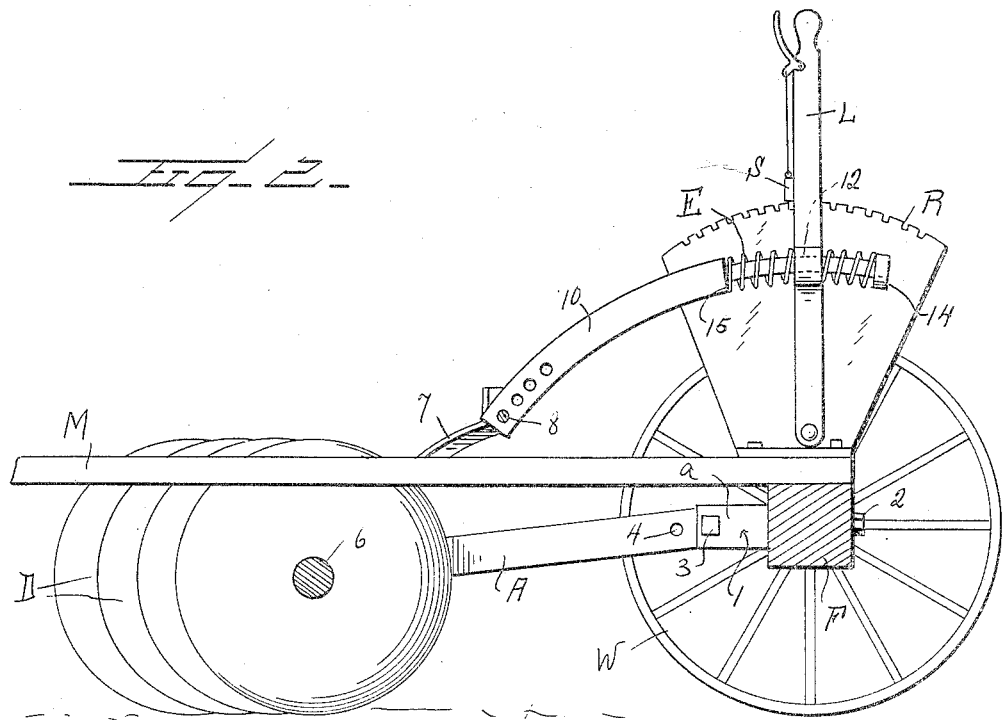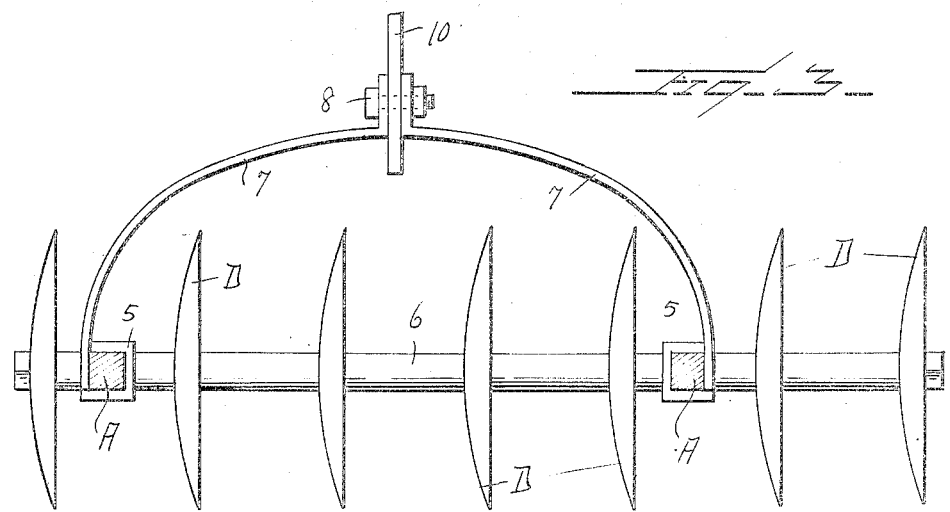

WILLIAM HEGLAND, OF PLENTYWOOD, MONTANA.

CULTIVATOR.

1,329,598.  Specification of Letters Patent.  Patented Feb. 3, 1920.

Application filed October 18, 1919. Serial No. 331,546.

*To all whom it may concern:*

Be it known that I, WILLIAM HEGLAND, a citizen of the United States, residing at Plentywood, in the county of Sheridan and State of Montana, have invented certain new and useful Improvements in Cultivators, of which the following is a specification, reference being had to the accompanying drawings.

This invention relates to certain improvements in cultivators and has relation more particularly to a device of this general character of a disk type, and it is an object of the invention to provide a novel and improved device of this character wherein the ground working members may operate with facility in either deep or shallow work.

Another object of the invention is to provide a novel and improved device of this general character wherein the ground working members or disks are arranged forwardly of the device and wherein the same are so supported that they may be readily and conveniently adjusted vertically, as occasioned by the requirements of practice.

An additional object of the invention is to provide a novel and improved device of this general character wherein the ground working members are supported in gangs, together with yieldable means whereby each of the gangs may be vertically adjusted.

The invention consists in the details of construction and in the combination and arrangement of the several parts of my improved cultivator whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in top plan of a cultivator constructed in accordance with an embodiment of my invention;

Fig. 2 is an enlarged sectional view taken substantially on the line 2—2 of Fig. 1, and, Fig. 3 is a fragmentary view partly in front elevation and partly in section of the cultivator as herein embodied.

As disclosed in the accompanying drawings, F denotes a frame of my improved cultivator, supported in a conventional manner by the ground engaging wheels W. The central portion of the frame is provided with a forwardly directed beam B, the outer ends of which having engaged therewith the brace members M suitably engaged with the opposite end portions of the frame F.

At opposite ends of its longitudinal center the frame F is provided in its forward face with a plurality of outstanding brackets 1, each of said brackets being substantially U shape in form with their side members $a$ extending forwardly. The intermediate or base portions of each of the brackets 1 are secured to the frame F through the instrumentality of a bolt 2 or the like.

Extending between the side members $a$ of the brackets 1 are the end portions of the rigid arms A, and said arms A are pivotally engaged with the brackets 1 by the removable bolts 3. Said end portions of the arms A are provided with a series of longitudinally spaced openings 4, so that said arms may be longitudinally adjusted with respect to the brackets 1 of the frame F, as occasioned by the requirements of practice. The arms A at each side of the longitudinal center of the frame F have their outer end portions provided with bearings 5, which rotatably support the shaft 6 for the disk D, whereby a series of disks are arranged at opposite ends or sides of the frame F in gangs. The arms A coacting with each series or gang of disks D are of different lengths with the longer arm at the outer end of the shaft 6 and the smaller arm at the inner end. By this means the shaft 6 is disposed on an inward incline with respect to the frame F. This angle of inclination may be varied by the adjustable connection of the arms A with the brackets 1.

Suitably engaged with the end arms A are the lower extremities of the rigid members 7 arranged on an upward and inward curvature, and the upper extremities of said members are secured through the medium of removable bolt 8 with the lower end portion of an arcuate shank or member 10. This lower end portion of the shank or member 10 is provided with a series of longitudinally spaced openings, so that, when required, the connection between said shank or member 10 and the members 7 may be adjusted.

The upper or opposite end portion of the member or shank 10 is loosely directed through an opening 12, provided in a vertically disposed lever L, suitably mounted upon the frame F. The upper extremity of the member or shank 10 is provided with a head 14, and the opposite end portion is provided with an enlargement 15. Interposed between the head 14 and the lever L and the enlargement 15 and the lever L are the expansible members E, herein disclosed as coil springs, encircling the shank or member 10. The expansible members E are of sufficient tension to assure the proper functioning of the lever L when it is desired to raise or lower the shaft 6, and at the same time permit a yielding movement of said shaft in a vertical direction in the event the disks E should come into contact with the stone or other undue obstruction during a working operation.

The lever L is provided with a latch mechanism S of a conventional type, which coacts with an upstanding rack R carried by the frame, whereby the shaft 6 may be held in its desired position.

By having the arms A forwardly directed, the disks D of each series or gang engage the ground at a point in advance of the frame F, and which particular arrangement materially facilitates the working of the cultivator and also assures the desired cutting of the ground in either deep or shallow work.

From the foregoing description, it is thought to be obvious that a cultivator constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A cultivator of the class described comprising a frame forwardly directed, brackets carried thereby, arms pivotally connected with the brackets, said pivotal connection being adjustable longitudinal of the arms, a disk carrying shaft rotatably supported by the arms, means for raising and lowering the arms and shaft, and means for holding said arms and shaft in different positions.

2. A cultivator comprising a frame forwardly directed, arms pivotally engaged therewith, a disk carrying shaft supported by the arms, upstanding members carried by the arms, a lever mounted upon the frame, and a shank carried by the lever and engaged with the upstanding members of the arms, said shank being loosely directed through the lever and an expansible member coacting with the shank and lever, whereby said shank is capable of limited movement independently of the lever.

3. A cultivator comprising a frame forwardly directed, arms pivotally engaged therewith, a disk carrying shaft supported by the arms, upstanding members carried by the arms, a lever mounted upon the frame, and a shank carried by the lever and engaged with the upstanding members of the arms, said shank being loosely directed through the lever and an expansible member coacting with the shank and lever, whereby said shank is capable of limited movement independently of the lever, said expansible member comprising a spring encircling the shaft and having one end portion engaging the lever, said shank being provided with a shoulder with which the opposite end portion of the spring engages.

In testimony whereof I hereunto affix my signature.

WILLIAM HEGLAND.